Figure 1:
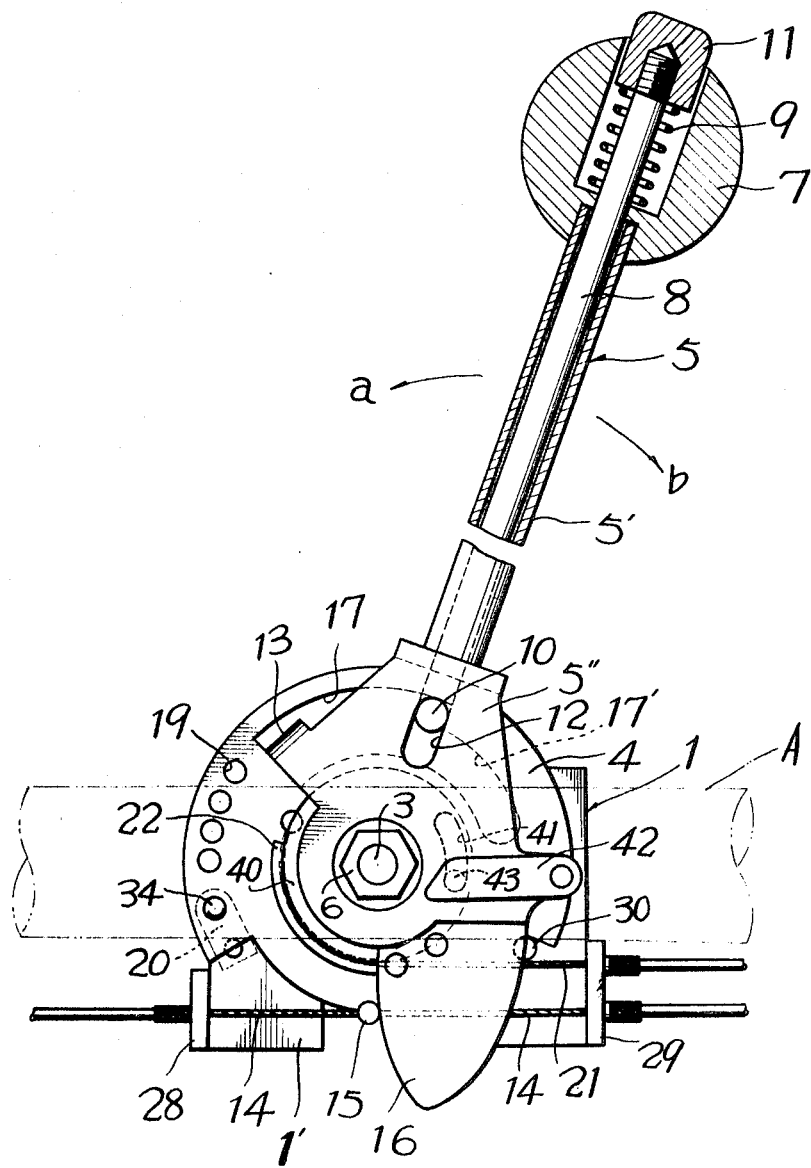

United States Patent

[11] 3,595,351

| [72] | Inventor | Takuo Ishida<br>c/o Shimang Industrial Company Ltd., No 77 3-cho, Oimatsu-cho, Sakai, Japan |
|---|---|---|
| [21] | Appl. No. | 849,736 |
| [22] | Filed | Aug. 13, 1969 |
| [45] | Patented | July 27, 1971 |
| [32] | Priority | Mar. 13, 1969 |
| [33] | | Japan |
| [31] | | 44/19056 |

[54] MANUAL CONTROL MEANS FOR OPERATING A SPEED CHANGE GEAR AND A BRAKE FOR A BICYCLE
5 Claims, 8 Drawing Figs.

[52] U.S. Cl.............................................. 192/4,
74/506, 74/548, 188/1 A, 116/124
[51] Int. Cl........................................................ F16h 57/10
[50] Field of Search........................................... 192/4, 4 R

[56] References Cited
UNITED STATES PATENTS
| 3,241,640 | 3/1966 | McCordic et al............ | 192/4 |
| 3,352,173 | 11/1967 | Freeland .................... | 192/6 X |

*Primary Examiner*—Benjamin W. Wyche
*Attorney*—McGlew and Toren

ABSTRACT: A manual control means for operating a speed change gear and a brake for a bicycle, including a bicycle frame on which are fixed a mounting plate rotatably supporting a wire reel and the base of a hand lever which a main hand lever body is secured. The wire reel positioned on a shaft projecting from the mounting plate and holding one end of a wire connected to a gear shifter hand lever includes a connecting element for transmitting its rotary movement to the wire reel and the engagement of this connecting element with the wire reel is releaseable it is possible to operate both the speed change gear and the brake by means of a single hand lever.

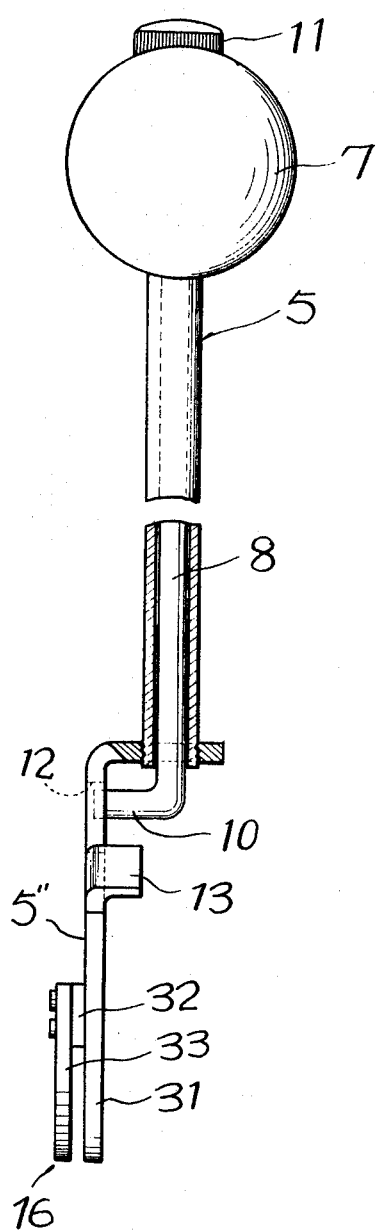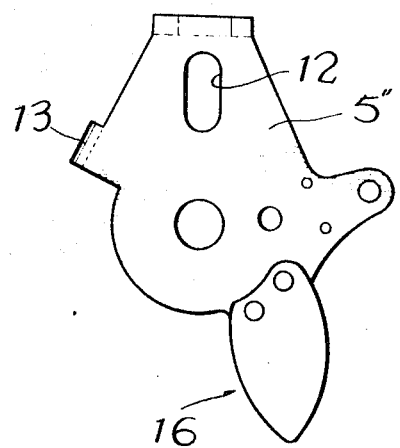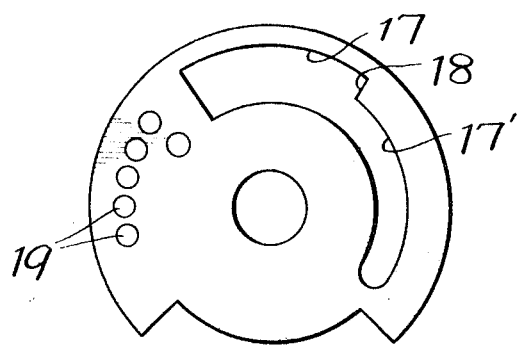

INVENTOR
TAKUO ISHIDA
BY McGlew and Toren
ATT.

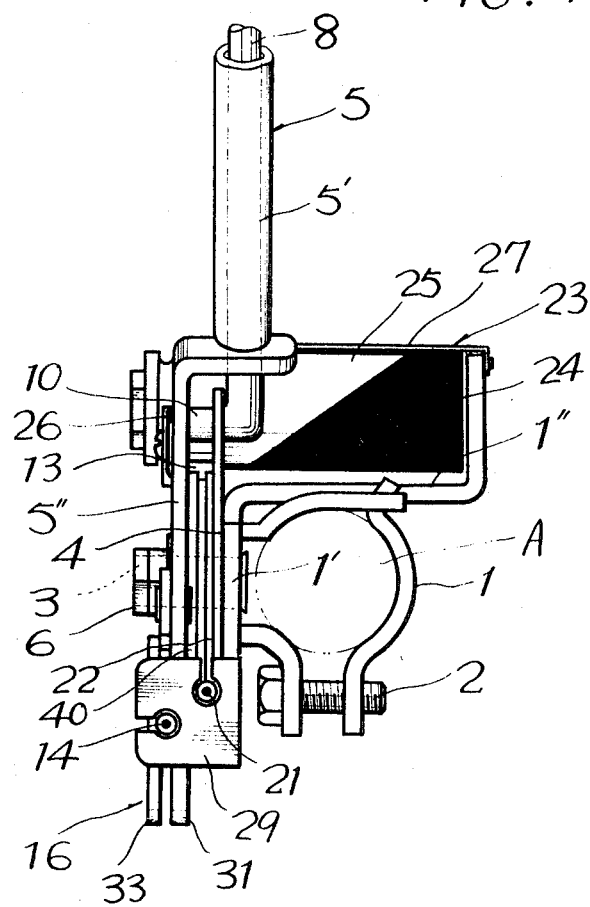

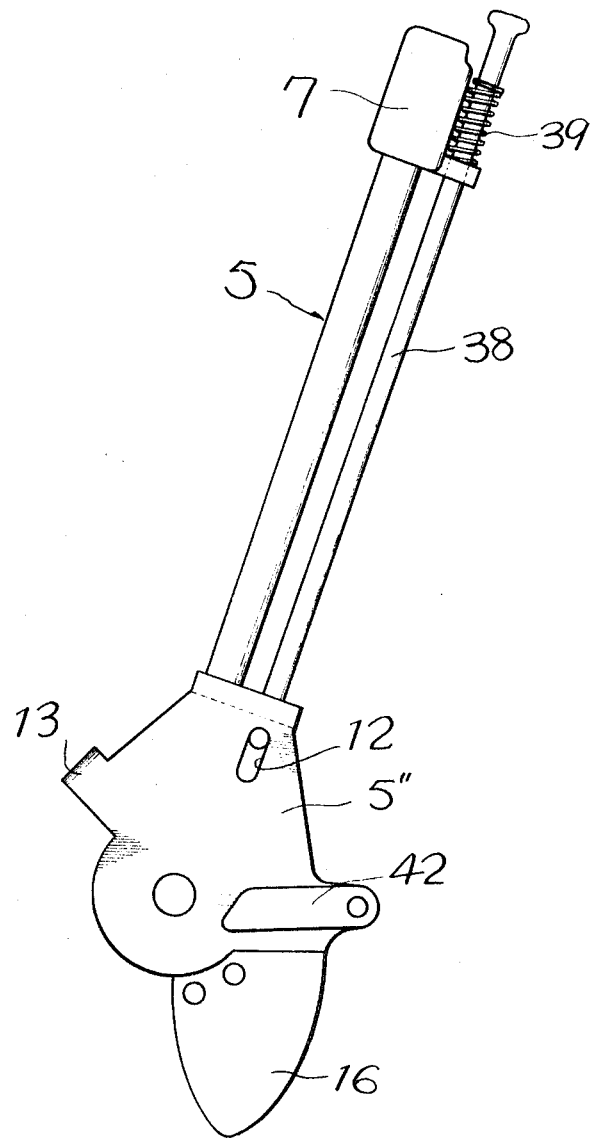

MANUAL CONTROL MEANS FOR OPERATING A SPEED CHANGE GEAR AND A BRAKE FOR A BICYCLE

The present invention relates to a device for operating the speed change gear of a bicycle and the brake to be used when the bicycle is parked, and more particularly it relates to a novel mechanism for operating these two different parts by means of a single operating device.

The bicycle is equipped, in general, with such a gearshift, for example, as a speed change gear that can be shifted between three speeds and five speeds. On the top of that, the proposition has been made in recent years of equipping the bicycle with a brake or a so-called "parking brake" which the cycler is able to use when he intends to park the bicycle or when he rides down a sloping road. By operating this brake the cycler is able to park the bicycle or to ride it down the incline safely.

However, when the parking brake is adapted together with the gearshift as has been mentioned, it is necessary to mount independent means on each of them for operating these gearings. Thus, the mounting of these means is restricted to a localized area of the bicycle since it is necessary to mount them in a position where they can be easily operated, and consequently each of these means is forced to be disposed mutually in a close position. Therefore, excess strain occurs at the place where these means are mounted, bringing about such defects and perils that the bicycle readily becomes bumpy in spite of its brief use and the cyclist may often manipulate the parking brake lever in error instead of the gearshift lever, or on the contrary, he may operate the gearshift lever by mistake when he really intends to park the bicycle. In order to avoid such a wrong manipulation, therefore, it is unavoidable that the cyclist must confirm the position of either the gearshift lever or the parking brake lever before operating either. Thus he cannot operate the lever without looking for its position and causing an unsafe condition.

Furthermore, when the incorrect lever is mistakenly operated, it gives occasion to such hazards that the bicycle may violently tumble over or continue to run even though the cycler thinks he has operated the parking brake. Besides, this method of mounting the operating means requires much labor and waste because the operating means are to be mounted on the bicycle after each of the other means has been separately mounted on its relative gearing, and further because they are formed independently. Accordingly, the brake of the present invention refers to the above-mentioned parking brake and it should be distinguished from the brake which is used for stopping the running bicycle.

Practically speaking, however, it is possible to employ this brake unit for parking purposes only, aside from the brake used for stopping the running bicycle. The object of the present invention is to make it possible to operate both the conventional speed change gear and the so-called parking brake by means of a single operating device.

Therefore, a principal objective of this invention is to provide a single operating device which positively enables the cycler to operate the speed change gear and the brake independently. Another objective of the invention is to provide a single means through which the cycler is not only able to brake the bicycle in any shifted position of the gearshift but to manipulate the brake regardless of this gearshift, namely in the state where the association is severed between the shift lever and a wire reel which holds a wire for operating the gearshift, and where the shifted speed of the gearshift is not subject to the brake operation and is restorable to its original speed when this brake operation is removed. Further, another objective of the invention is to provide a single operating means which the cycler is able to operate in a correct manner without having to visually confirm his manipulation, or to provide the means through which he can prevent a wrong operation, optionally selecting each different function of the two different gearings, and further in which the provision is so made that the shift lever is operable in its position whenever he intends to shift the speed change gear and also that the connection is cut off between the parking brake and the wire reel holding the operating wire of the gearshift whenever he intends to operate this brake, whereby this brake works different functions only in case it is liable to bring about a dangerous condition. Further this invention has as another objective the provision of a single operating means which saves much labor in manufacture and is easily mounted on the bicycle.

Figure 2:
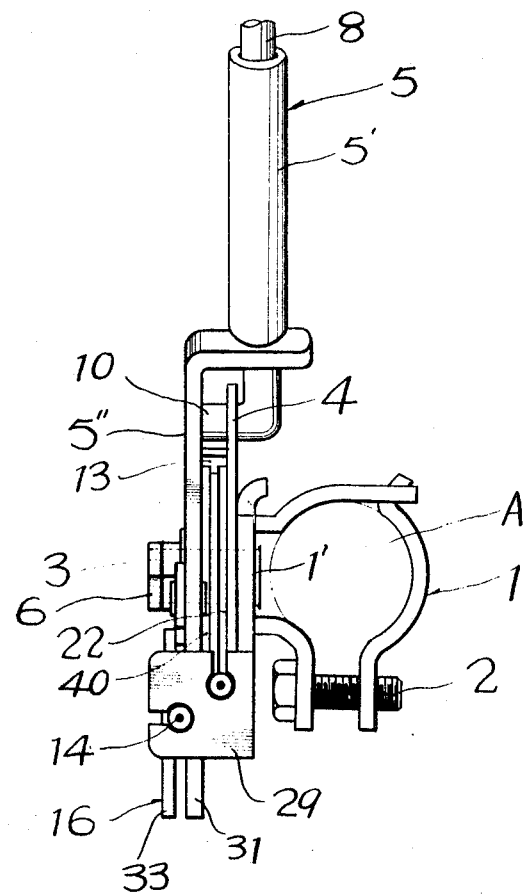
Figure 6:
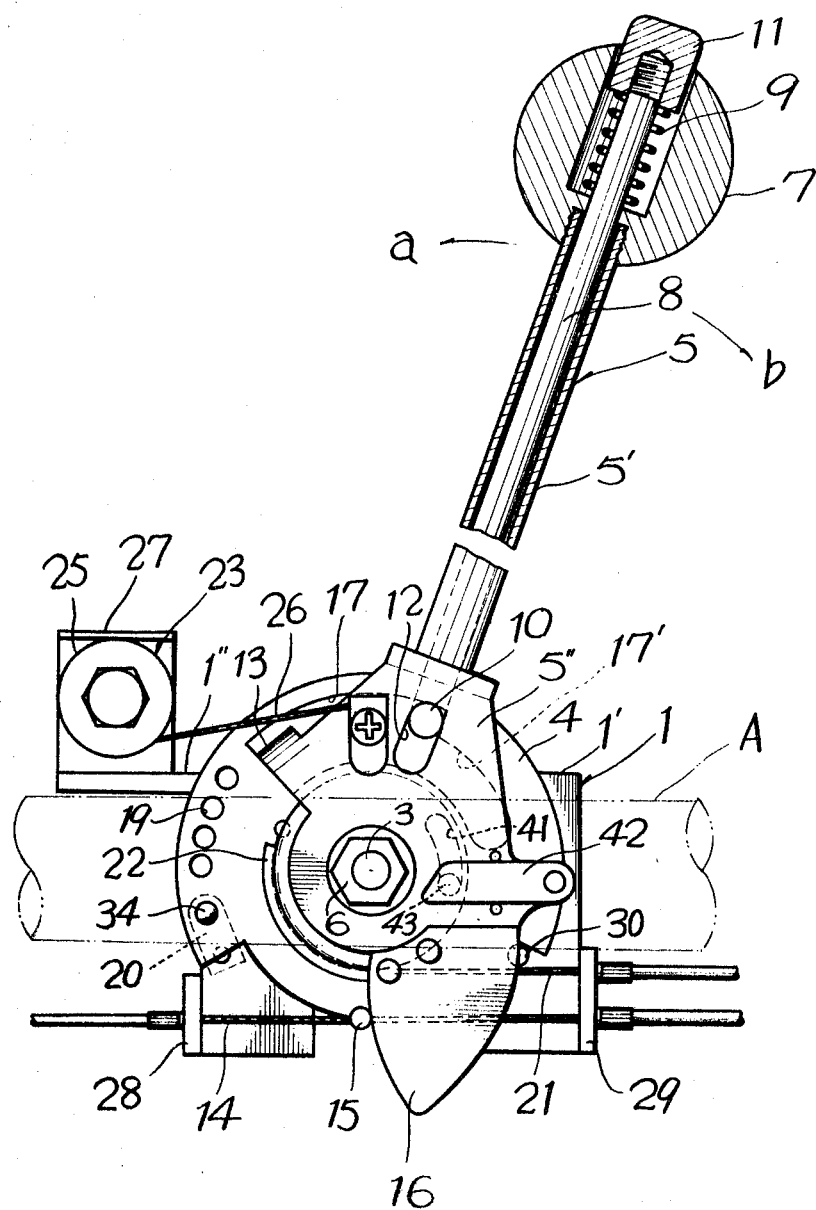

Referring to one of the embodiments of the present invention in connection with the accompanying drawings, FIG. 1 is a flank view partially showing the construction embodied in accordance with the invention, FIG. 2 is a front section view partially showing this construction, FIGS. 3 thru 5 are respectively illustrative of the principal elements of the construction in their disassembled forms, especially in which the FIG. 3 shows a shift lever and the FIG. 4 shows the base of the shift lever, while the FIG. 5 shows a wire reel for holding the operating wire of this lever, FIGS. 6 and 7 show another embodiment of the invention in which FIG. 6 is a flank view showing a part thereof, the FIG. 7 is a front view showing the embodiment in an abbreviated form, and FIG. 8 is illustrative of the shift lever in a further embodiment of the invention.

Setting in detail forth each embodiment of the invention in detail with reference to the accompanying drawings, reference sign A designates the top tube of a bicycle on which the operating means of the present invention is mounted. However, this tube is replaceable with a twin tube by altering the shape of the following mounting plate in conformity therewith. Reference numeral 1 is the mounting plate fixed on the top tube by means of bolts 2 or the like and composed of a vertical surface portion 1' and a horizontal surface portion 1''. Horizontally fixed on one side of the vertical surface portion 1' is a shaft 3 on which a wire reel 4 and the base 5'' of the shift lever 5 are rotatably held. A lock nut 6 is screwed onto the free end of the shaft 3 and by adjustably changing the tightening condition of the lock nut 6 it is possible to change the resistance of the wire reel 4 and the shift lever 5 against rotation. The shift lever 5 comprises the shift lever body 5' and the base 5'' of this lever. The shift lever body 5' is constructed as a hollow rod and one end is threaded into the horizontally bent surface of the base 5''. Attached to the other end of the shift lever body 5' is a knob 7 in which an aperture is formed. Disposed in the hollow portion of the shift lever is a gearshift rod 8 of rod shape which is biased upwardly by means of a spring 9 located in the aperture of the knob 7. The low end of the gearshift rod 8 includes a connecting element 10 bent into the base 5'' and the upper end thereof includes a push button 11 for pressing the knob 7 or the like. The base 5'' of the shift lever includes the free end of the connecting element 10 of the gearshift rod 8 held within a channel 12, a projection 13 engageable with a below-mentioned channel edge of the wire reel 4, and a working element 16 provided in engagement with a contact element 15 fixed on the intermediate portion of the wire 14 which has one end connected to the parking brake (not shown).

When the shift lever 5 rotates in the unilateral direction (viz in the direction of the arrow a with reference to FIG. 1 of the drawing), the projection 13 transmits the rotation of this lever 5 to the wire reel 4. When the working element 16 moves, it presses the contact element 15 to transfer the wire 14 and consequently operate the brake. Incidentally, the working element 16 is constructed by securing a plate 33 to a counter plate 31 through an interposed element 32 which is thicker than the diameter of the wire 14, and then by inserting the wire 13 through the space formed between said plate 33 and said counter plate 31.

The interval between the counter plate 31 and the plate 33 is smaller than the lateral dimension of the contact element 15 fixed on said operating wire 14. Therefore, when the base 5'' of the shift lever rotates towards the direction of the arrow *b*, one side of the counter plate 31 and one side of the plate 33 abut respectively against the contact element 15 to transfer the operating wire 14. In other words, the contact element 15 is composed of a cylindrical body extending transversely of the operating wire and its axial dimension is longer than the interval and contacts the working element 16 to transfer the operating wire 14.

While it is possible to employ such a brake as the above-mentioned parking brake in order to secure the exclusive use for the parking purpose only, it is further possible to employ for this purpose a brake that can be used when the bicycle is running. In the accompanying drawing is illustrated a brake of the latter type wherein the brake lever mounted on the handle bar is connected with the brake of the rear wheel by means of the operating wire which has its inner wire portion inserted through the space of the working element 16; the contact element 15 is mounted on the inner wire so that the brake can be operated along with the movement of the element 15 without manipulating the brake lever.

As is shown in the FIG. 5, near the periphery of the wire reel 4 an arciform channel 17 is provided into, which the connecting element 10 of the gearshift rod 8 extends laterally (in the direction parallel to the axis). In the intermediate portion of the (viz channel 17 a shoulder or notch 18 is arranged and a slot 17' is formed on one end of the channel 17. When the connecting element 10 of the gearshift rod 8 which passes through the channel 17, abuts against the notch 18 and gives the shift lever 5 a single full rotation in the unilateral direction (viz. in the direction of the arrow *b* with respect to the drawing), the movement of the shift lever 5 is transmitted to the wire reel 4. However, if the knob 11 of the gearshift 8 is pressed down against the spring 9, the connecting element 10 of the gearshift 8 is depressed and comes out of the notch 18 and consequently the movement of the shift lever 5 is not transmitted to the wire reel 4 since the connecting element 10 of the gearshift rod 8 passes through the slot 17' thereby moving the shift lever 5 only.

In other words, the gearshift rod 8 is normally pressed upwards by means of the spring 9 and the connecting element 10 of the rod 8 is engaged with the notch 18 of the channel 17 formed in the wire reel 4; thus when the shift lever body 5' moves, it transmits its movement to the wire reel 4 through the engaging element 10, and further when the gearshift rod 8 is pushed down, this engaging element 10 comes out of the notch 18 so that the movement of the shift lever body 5' is not transmitted to the wire reel 4. In short, it is noted that the gearshift rod 8 of the present invention is an engageable and disengageable means which can freely transmit its movement to the wire reel or breaks off the transmission of its movement to wire reel 4. Near the periphery of the wire reel 4 a plurality of round apertures 19 are provided into which a ball 34 is inset and held by means of a plate spring 20 mounted on the mounting plate 1. Therefore, when the speed is changed, the position where the ball is inset is also changed, and after the speed has been changed, the wire reel 4 is held in the changed position of the ball. Incidentally, FIG. 1 illustrates five separate round apertures which are applicable to a five-speed-change gear. Likewise, in case of a three-speed-change gear, three separate round apertures are applicable thereto.

On the wire reel 4 is mounted a small wire reel 22 which holds an operating wire 21 which has one end connected to a gearshift (not shown). The operating wire 21 is held at one end between the wire reels 4 and 22 and when the wire reel 4 rotates, this operating wire 21 is pulled up to a fixed length in accordance with the angle at which the wire reel 4 rotates to shift the speed change gear. An indicator 23 shown in the FIGS. 6 and 7 is mounted laterally of the horizontal surface portion 1'' of the mounting plate. This indicator 23 comprises a rotary cylinder 25 forming an indicating portion 24 on its peripheral surface, a secures element 26 connecting this rotary cylinder 25 to a portion of the shift lever 5, and an indicating means 27 mounted on the rotary cylinder 25 indicates the indicating holes and the changed speed or the operational condition of the parking brake.

The indicator 23, shown in the FIGS. 6 and 7, the indicating means 27 shelters the rotary cylinder 25 and is marked with abbreviated signs for indicating the indicating holes and the shift of the gear or the operational conditions of the parking brake. The rotary cylinder 25 is provided with a restorable spring (not shown).

When the shift lever 5 is rotated, the rotary cylinder 25 also rotates through the connecting element 26 and transfers the indicating portion 24. Thus the indication in the hole of the indicating means 27 is changed so that the operational condition of the parking brake can be confirmed by reading the abbreviated signs indexing the shifted speed or the operation of the parking brake. When the gearshift rod 8 is pushed down to cut off the transmission of its movement to the wire reel 4 and the shift lever 5 is restored to its original position in order to operate the parking brake after the shift lever 5 has been moved, the restorable spring of the rotary cylinder 25 works to promote this restoring operation of the shift lever 5.

Reference numerals 28 and 29, respectively, designate supporting plates for the outer wires of the operating wires 14 and 21 provided on the mounting plate 1 see FIG. 6. 30 is a stopper of the wire reel 4 provided on the mounting plate 1. By 40 is shown a fixing plate for the shift lever 5, provided with an arciform channel 41 having a gradual inclination.

Normally the base 5'' of the shift lever 5 holds a ball 43 pressed by means of a plate spring 42 and keeps the ball within the friction channel 41. Furthermore, even when the parking brake is operated, this base 5'' still serves to keep the ball 43 stationary in its position because the latter is pressed to abut against the friction channel 41 which is gradually upward inclined.

In the above explanation of the embodiment executed in accordance with the present invention, reference has been made to the hollow-typed shift lever 5 only. However, it is also possible to use another type of gearshift rod 8 positioned outside the shift lever 5.

As illustrated by the further embodiment set forth in FIG. 8, extending along and movably mounted on the shift lever 5 is an operating means 38 composed of a rodlike body having its upper end protruding above the top of the shift lever knob 7. Normally, the operating means 38 is biased upwardly by a spring 39, and is constructed in such a manner that it passes through the horizontal surface portion of the shift lever 5 and is bent at its lower end to pass through the channel 17 of the wire reel 4 into the channel 12 of the base 5''.

Now referring to the operational process of the illustrated embodiment in the FIG. 8, it is quite possible to shift the gear into any preferred speed merely by moving the shift lever 5 without having to push down the knob 11, since the operating wire 21 connected with the gearshift is pulled out in the same manner as the conventional gearshift lever, to a fixed length equivalent to the angle through which the shift lever 5 has been moved.

When the cycler intends to operate the parking brake in order to park the bicycle or to ride down an incline, he has only to move the shift lever 5 after pushing down the gearshift rod 8 by means of the knob 11 so that the engaging element 10 comes out of engagement with the notch 18 formed in the wire reel 4. When the shift lever 5 is moved in this manner, the wire reel 4 is not displaced by the lever. As a result, the working element 16 provided on the base 5'' abuts against the contact element 15 of the operating wire 14 connected to the parking brake and transfer the wire 14 by the fixed length equivalent to the angle through which the working element 16 has been moved, whereby the parking brake is operated to an extent equivalent to the angle. In this case, the connection between the shift lever 5 and the wire reel 4 is severed and thus the speed change operation is not subject to this brake operation. The release of the parking brake is made possible by moving the shift lever 5 in the direction where it is restored to its original position.

In this case, the restorable spring of the indicator 23 operates smoothly so that the gearshift rod moves through the slot 17'; and by means of the spring 9 provided in the knob 7 as seen as the engaging element 10 reaches the notch 18, the engaging element 10 is lifted upwardly and comes into engagement with the notch 18.

Incidentally, the present invention is not restricted to the disclosed construction of the embodiments herein, but is replaceable with an infinite variety of any other preferred constructions.

I claim:

1. A manual control means for operating a speed change gear and a brake for a bicycle which comprises a mounting plate fixed on a bicycle frame, a shaft protruded from one side of the mounting plate, a wire reel rotatably mounted on said shaft, a first wire secured at one end to said wire reel and at the other end to the speed change gear, said manual control means being rotatably mounted in said shaft and including a base having a working element, a second wire having one end thereof connected to the brake, said working element arranged to transfer said second wire, a main hand lever body secured to said base, a means for selectively transmitting the rotary movement of said main hand lever body, said means comprising a connecting element moving along with said main hand lever body to transmit the rotary movement thereof to said wire reel when said connecting element moves in one direction, but when it moves in the other direction, said connecting element releases the rotary movement of said main hand lever body.

2. A manual control means for operating a speed change gear and a brake for a bicycle which comprises a mounting plate secured to a bicycle frame, a shaft protruded from one side of said mounting plate, a wire reel of disc shape rotatably mounted in said shaft, said wire reel including an arciform channel formed adjacent the outer periphery thereof, a notch provided in the intermediate portion of said channel, said wire reel forming a narrow slot on one side thereof, a first wire having one end connected within the narrow slot of said wire reel and the other end connected to the speed change gear, a second wire having one end connected to the brake, a hand operable lever rotatably mounted on said shaft including a base provided with a working element for transferring said second wire connected to the brake, said hand operable lever comprising a main hand lever body secured to said base, a means movable with said main hand lever body and including a rodlike portion which moves along with the main hand lever body and has an engagement portion at one end thereof, and said engagement portion passing through the arciform channel of said wire reel and being displaceable therein into engagement with said notch in said channel.

3. A manual control means for operating a speed change gear and a brake for a bicycle, as set forth in claim 2, wherein said main hand lever body comprises a hollow lever body fixed on said base, a means for releasably transmitting the rotary movement of said main hand lever body in operative engagement with said rodlike portion, said rodlike portion disposed within the hollow portion of said main lever body, and said means for releasably transmitting the rotary movement comprising a knob secured to the end of said rodlike portion spaced from the end containing said engagement portion and spring biased away from said engagement portion.

4. A manual control means for operating a speed change gear and a brake for a bicycle, as set forth in claim 2, wherein said rodlike portion being disposed in spaced relationship with and arranged to move axially relative to said main hand lever body, a means for releasably transmitting the rotary movement of said main hand lever body comprising a pushbutton mounted on the opposite end of said rodlike portion from its engagement portion, and a spring biasing said pushbutton away from said engagement portion.

5. A manual control means for operating a speed change gear and a brake for a bicycle, as set forth in claim 1, wherein an indicator being rotatably secured to said mounting plate, said indicator comprising a rotary cylinder having an indicating portion for displaying the shift of the speed change gear and an indicating means, a means interconnecting said rotary cylinder and said main hand lever body for transmitting the movement of said main hand lever body to said indicating means, and said indicating means having abbreviated signs thereon for indicating both the change speed and the shifted brake.